United States Patent
Kumar

(10) Patent No.: US 7,761,917 B1
(45) Date of Patent: Jul. 20, 2010

(54) METHOD AND APPARATUS FOR THE DETECTION AND PREVENTION OF INTRUSIONS, COMPUTER WORMS, AND DENIAL OF SERVICE ATTACKS

(75) Inventor: Dileep Kumar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 2133 days.

(21) Appl. No.: 10/608,746

(22) Filed: Jun. 27, 2003

Related U.S. Application Data

(60) Provisional application No. 60/428,010, filed on Nov. 21, 2002.

(51) Int. Cl.
H04L 29/14 (2006.01)

(52) U.S. Cl. .......... 726/23; 726/25

(58) Field of Classification Search .......... 713/168, 713/182, 189
See application file for complete search history.

(56) References Cited

U.S. PATENT DOCUMENTS

| | | | |
|---|---|---|---|
| 5,278,901 A | 1/1994 | Shieh et al. | |
| 5,414,833 A | 5/1995 | Hershey et al. | |
| 5,557,742 A | 9/1996 | Smaha et al. | |
| 5,720,033 A | 2/1998 | Deo | |
| 5,727,146 A | 3/1998 | Savoldi et al. | |
| 5,826,013 A | 10/1998 | Nachenberg | |
| 5,948,104 A | 9/1999 | Gluck et al. | |
| 5,983,348 A | 11/1999 | Ji | |
| 5,991,881 A | 11/1999 | Conklin et al. | |
| 6,035,423 A | 3/2000 | Hodges et al. | |
| 6,269,456 B1 * | 7/2001 | Hodges et al. | 714/38 |
| 6,272,641 B1 | 8/2001 | Ji | |
| 6,279,113 B1 | 8/2001 | Vaidya | |
| 6,321,338 B1 | 11/2001 | Porras et al. | |
| 6,477,651 B1 | 11/2002 | Teal | |
| 6,785,821 B1 * | 8/2004 | Teal | 726/23 |
| 6,792,543 B2 * | 9/2004 | Pak et al. | 726/24 |
| 7,017,187 B1 * | 3/2006 | Marshall et al. | 726/24 |
| 7,073,198 B1 * | 7/2006 | Flowers et al. | 726/25 |
| 7,080,000 B1 * | 7/2006 | Cambridge | 703/21 |
| 7,152,164 B1 * | 12/2006 | Loukas | 713/188 |
| 2003/0145228 A1 * | 7/2003 | Suuronen et al. | 713/201 |
| 2003/0226038 A1 * | 12/2003 | Raanan et al. | 713/201 |

OTHER PUBLICATIONS

Koral Ilgun et al. "State Transition Analysis: A Rule-Based Instrusion Detection Approach", IEEE Trans. Software Eng. vol. 21, No. 3, Mar. 1995, pp. 181-199.

(Continued)

*Primary Examiner*—Minh Dinh

(57) ABSTRACT

An apparatus and method for the detection and prevention of intrusions, DOS attacks, and computer worms comprising of: 1) dynamically loading information about vulnerabilities and exposures 2) intercepting application data 3) using information about vulnerabilities and exposures to detect their exploitation 4) taking custom action to stop the exploitation. Invention also includes an apparatus and method for reducing time it takes to capture information about vulnerabilities and exposures for the purpose of detecting their exploitation and stopping it. Invention further includes an apparatus and method to convert information about vulnerabilities and exposures into an intermediate form that optimizes the processing speed of the method and apparatus for stopping intrusions, DOS attacks, and computer worms.

15 Claims, 8 Drawing Sheets

Primary elements of the apparatus and method for stopping intrusion

OTHER PUBLICATIONS

Teresa F. Lunt "A survey of intrusion detection techniques" Computers & Security, 12 (1993) pp. 404-418 (Elsevier Science Publishers Ltd.).

Teresa F. Lunt et al. "A Real-Time Instrusion-Detection Expert System (IDES)", Final Technical Report, Feb. 28, 1992 (SRI International) pp. 1-156.

Herve Debar et al. "Towards a Taxonomy of Intrustion-Detection Systems" (Elsevier Preprint), Oct. 28, 1998 pp. 1-31.

Shiuh-Pyng Shieh et al. "On a Pattern-Oriented Model for Intrusion Detection" IEEE Trans. Knowledge and Data Eng. vol. 9, No. 4 (1997) pp. 661-667.

Helen J. Wang et al. "Shield: Vulnerability-Driven Network Filters for Preventing Known Vulnerability Exploits" SIGCOMM '04, Aug./Sep. 2004.

"Computer Security Threat Monitoring and Surveillance" James P. Anderson Co., Feb. 26, 1980, pp. 1-54.

Kenneth J. MacLeod "Patch Management and the Need for Metrics" SANS Institute (c) 2004 pp. 1-20.

Anderson, James P. "Computer Security Threat Monitoring and Surveillance", Apr. 15, 1980.

Newmann, Peter http://www.csl.sri.com/users/neumann/neumann.html.

Denning et al., "Prototype IDES: A Real-Time Intrusion-Detection Expert System," SRI Project ECU 7508, SRI International, MenloPark.

Ilgun et al., State Transition Analysis: A Rule-Based Intrusion Detection Approach, IEEE Transactions on Software Engineering, vol. 21, No. 3, Mar. 1995.

Liepins et al., "Anomaly Detection: Purpose and Framework," US DOE Office of Safeguards and Security.

Shieh et al., A Pattern-Oriented Intrusion-Detection Model and Its Applications .Copyrgt. 1991 IEEE.

Common Vulnerabilities and Exposures (CVE), http://www.cve.mitre.org.

Vulnerability Statistics, http://icat.nist.gov/icat.cfm?function=statistics.

Debar, et al., "Towards a Taxonomy of Intrusion-Detection Systems," Computers Networks 31 (1999), 805-822.

Lunt, "A Survey of Intrusion Detection Techniques," Computers & Security. 12 (1993) 405-418.

Veldman, Frans, "Heuristic Anti-Virus Technology", Proceedings of the International Virus Protection and Information Security Conference, Apr. 1, 1994.

\* cited by examiner

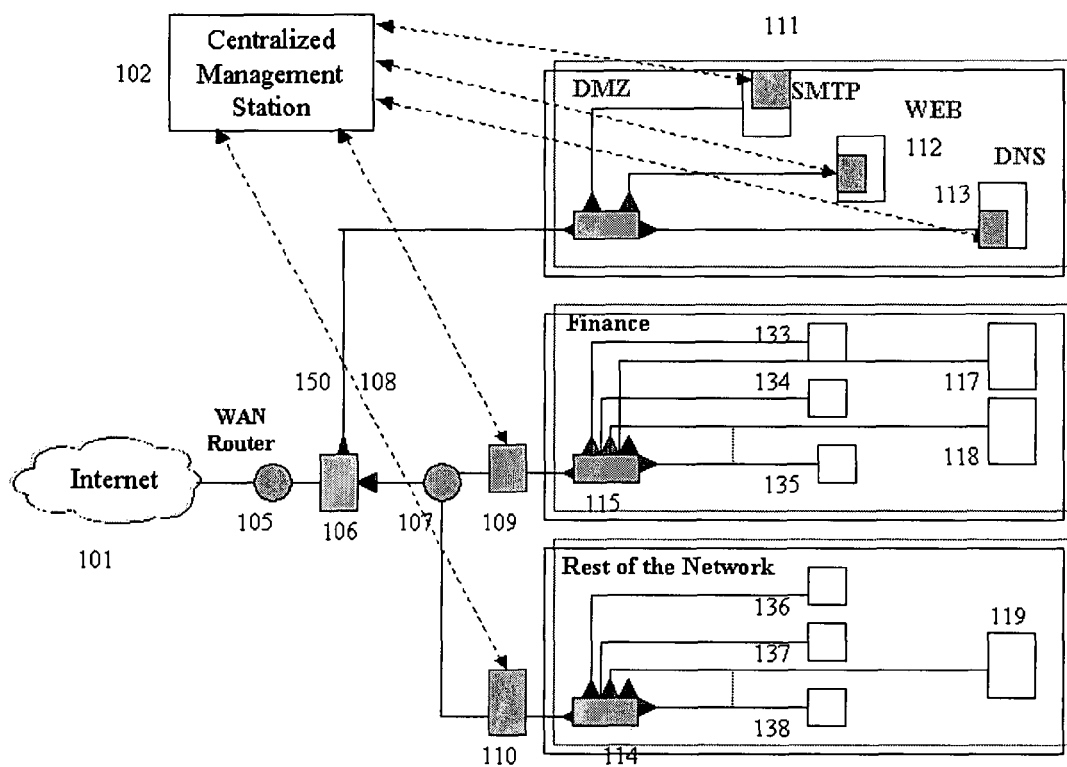
Fig.1: Placement for the Invention Apparatus in an Organization to stop intrusions

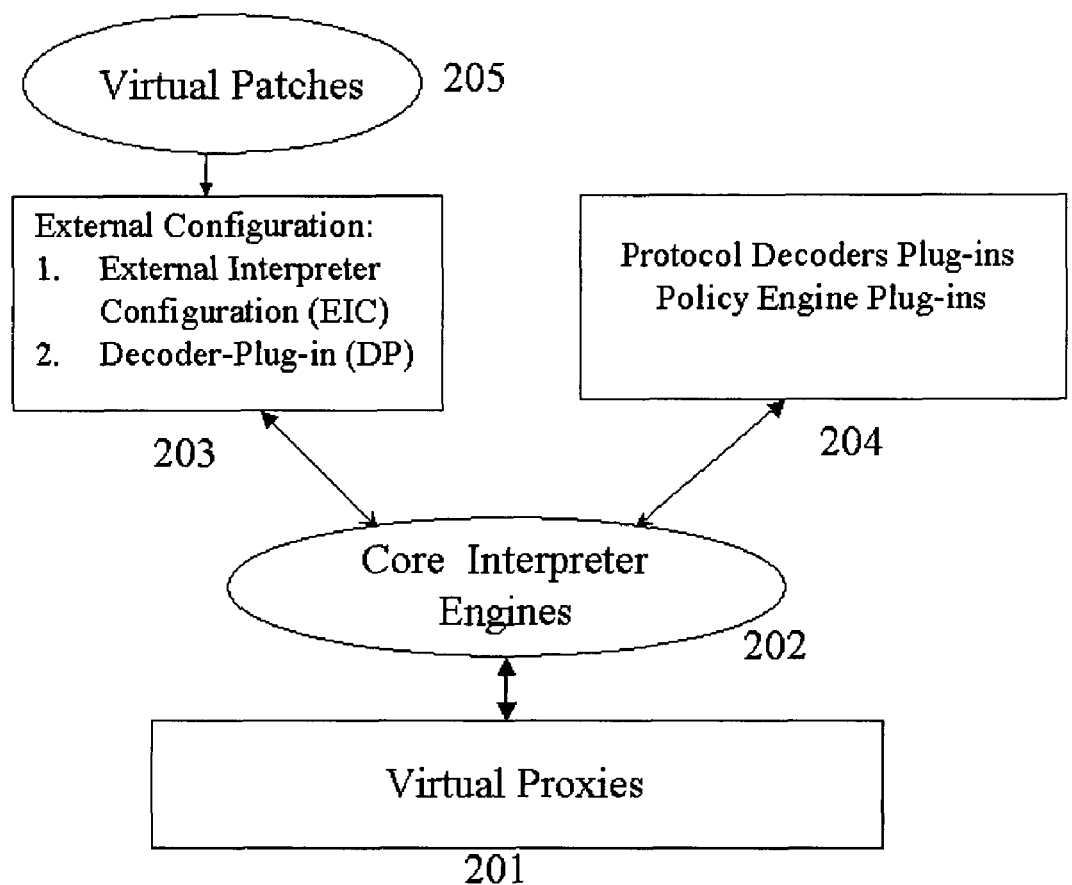
Fig.2: Primary elements of the apparatus and method for stopping intrusion

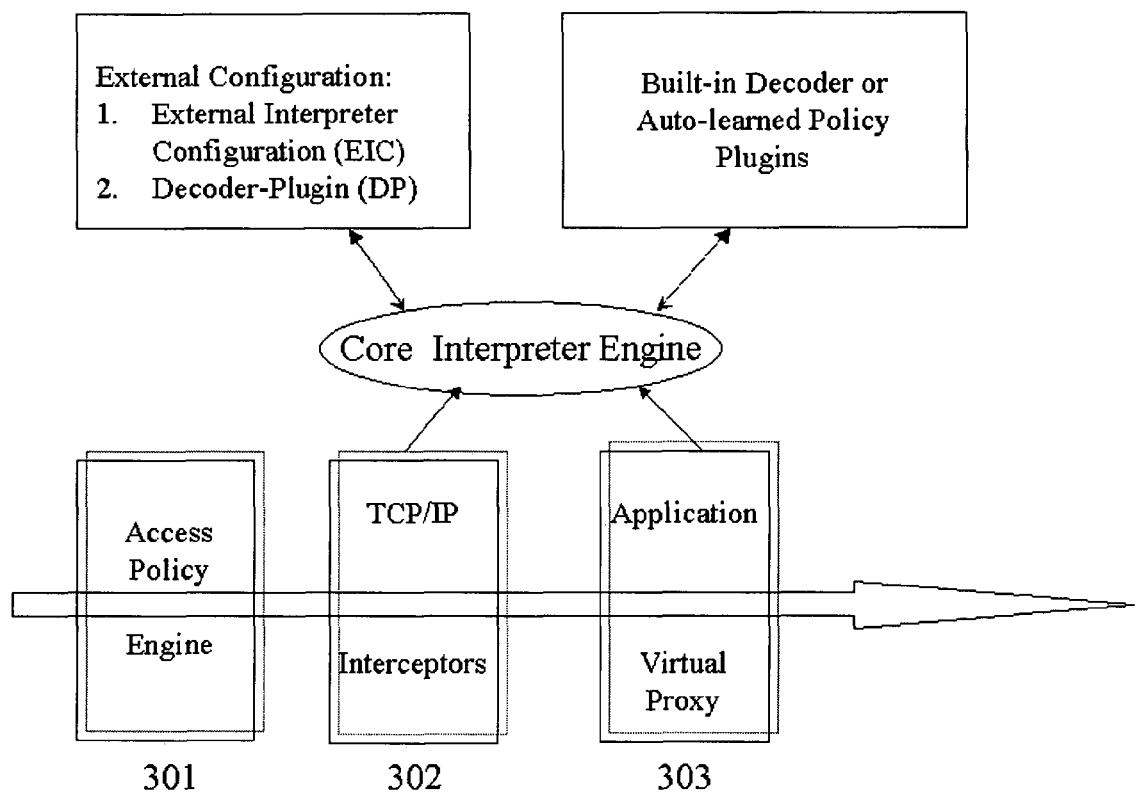
Fig.3: Primary elements of a network based apparatus that uses this invention

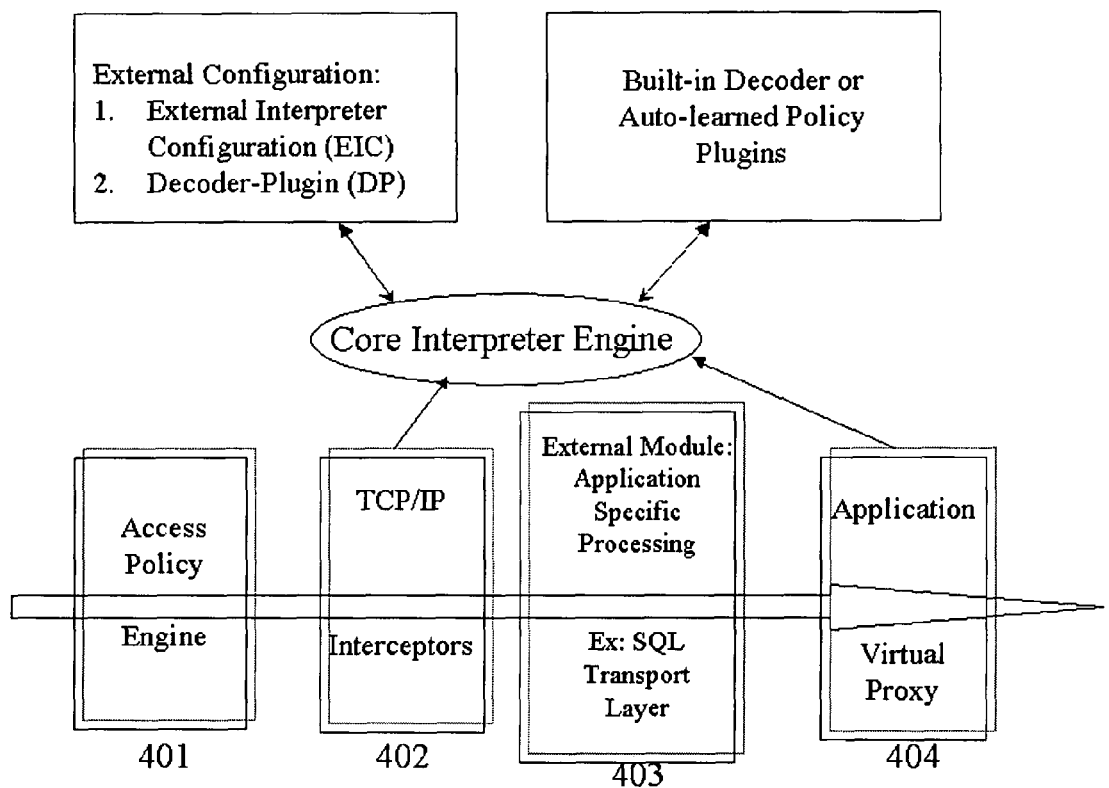
Fig.4: Primary elements of a host based apparatus that uses this invention

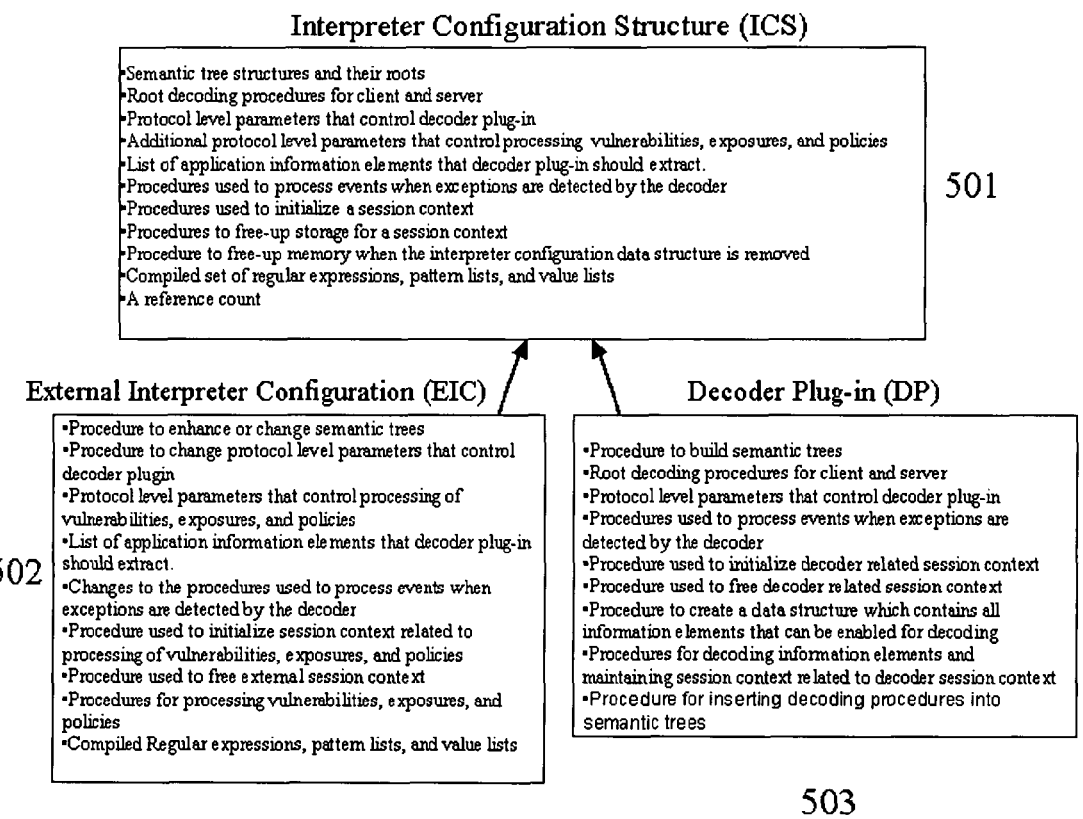
Fig.5: Using EIC and DP to build ICS

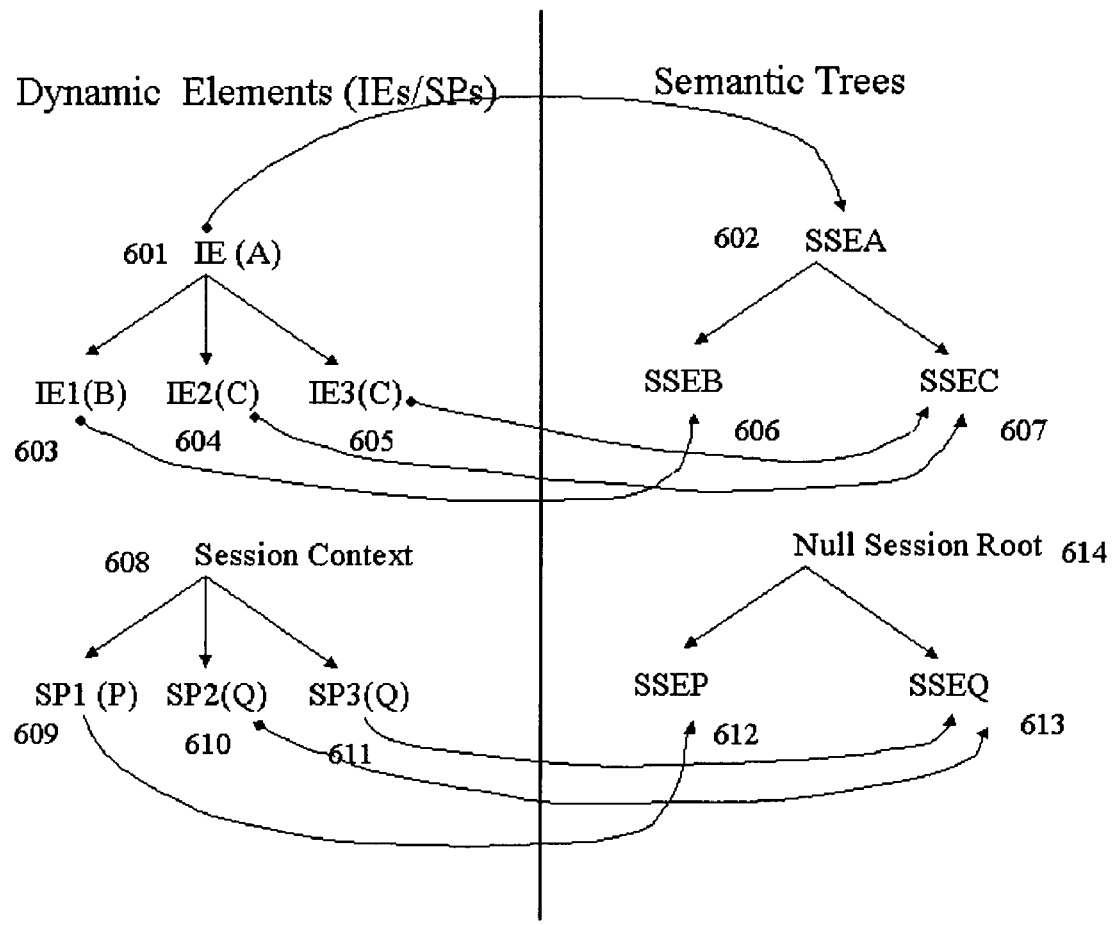
Fig. 6: Relationship between dynamic application elements and semantic trees

|  | 2002 | 2001 | 2000 |
|---|---|---|---|
| CVE Count | 1307 | 1506 | 990 |

Figure 7: Total CVE count on yearly basis

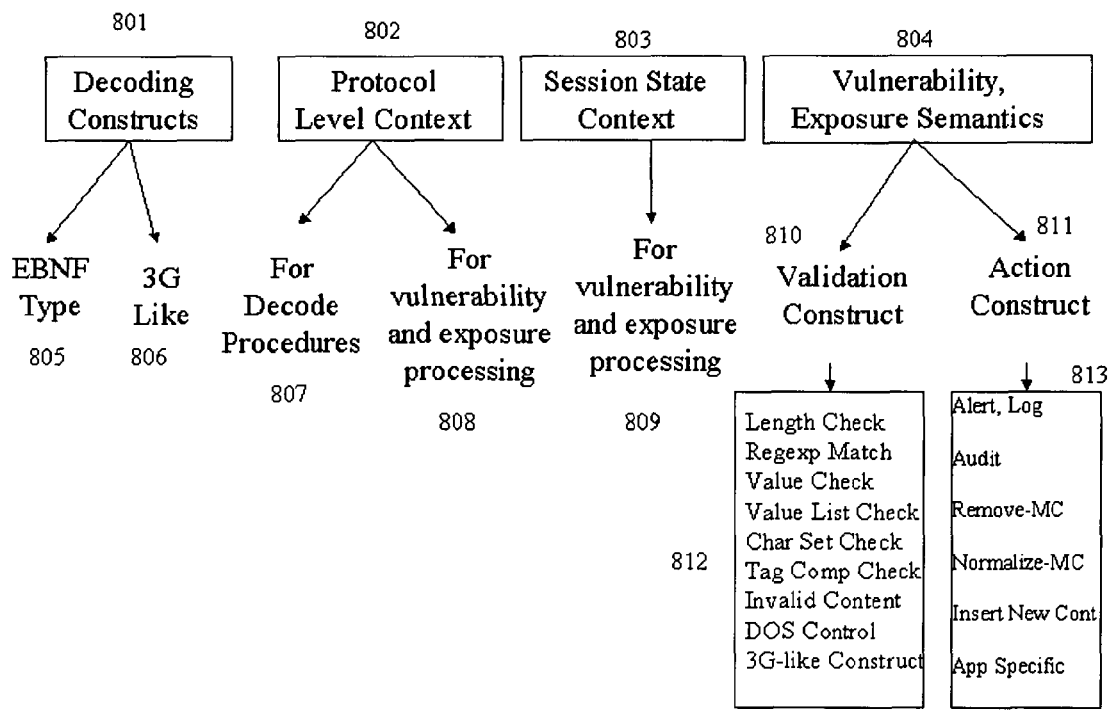
Figure 8: Elements of a method and apparatus for capturing vulnerabilities/exposures.

METHOD AND APPARATUS FOR THE DETECTION AND PREVENTION OF INTRUSIONS, COMPUTER WORMS, AND DENIAL OF SERVICE ATTACKS

CROSS REFERENCE TO RELATED APPLICATIONS

This application is based on provisional application Ser. No. 60/428,010, filed on Nov. 21, 2002.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

The present invention relates generally to intrusion prevention, computer worm filtering, and prevention of denial of service (DOS) attacks and more specifically it relates to a method and apparatus for accurate detection and automatic prevention of intrusions, filtering of computer worms, and prevention of DOS attacks.

History of Intrusion Detection and Computer Worms

In 1980, James P. Anderson published a study outlining ways to improve computer security auditing and surveillance at customer sites. The original idea behind automated Intrusion Detection (ID) is often credited to him.

Between 1984 and 1986, Dorothy Denning and Peter Neumann researched and developed the first model of real time Intrusion Detection System (IDS). The prototype was named Intrusion Detection Expert System (IDES).

The report published by James P Anderson and the work on IDES was the start of research on IDS throughout 1980s and 1990s.

A computer worm is a self-contained program (or set of programs) that is able to spread functional copies of itself or its segments to other computer systems (usually via network connections). Unlike viruses, worms do not need to attach themselves to a host program.

The first ever program that could be called a worm, as per definition, was developed for the assistance of air traffic controllers by Bob Thomas in 1971. This "worm" programmer would notify air traffic controllers when the controls of a plane moved from one computer to another. In fact, this worm named "creeper" would travel from one computer screen to the other on the network showing the message, "I'm creeper! Catch me if you can!" The difference from most worms was that this creeper did not reproduce itself.

DESCRIPTION OF THE RELATED ART

It can be appreciated that intrusion prevention, computer worm filtering, and DOS attack prevention for computer systems in an organization have been in use for years.

There are two types of intrusions detection systems. The network based intrusion detection systems act as networking devices and scan the packets passing through them. The host based intrusion prevention apparatus resides physically on the computer system it is protecting.

The network based intrusion detection and prevention systems available today apply various intrusion detection techniques. The most network-based systems deploy one of three methods for intrusion detection: signature recognition using pattern matching, protocol decoding, and anomaly detection.

U.S. Pat. No. 6,279,113 to Vaidya describes a dynamic signature-inspection based network intrusion detection method. This method uses the signature profile of network objects to detect security violations. U.S. Pat. No. 6,477,651 to Teal describes a system and method for detecting unauthorized or malicious use of network resources that instantiates one or more analysis objects to detect signatures associated with attacks on network vulnerabilities.

The protocol decode techniques are used to ensure the data received conforms to rules defined in RFCs. A small percentage of known and unknown attacks can be detected using this method. There are few known methods and systems that claim to use anomaly detection using heuristics, statistical methods, or probabilistic approach for intrusion detection. For example, U.S. Pat. No. 6,321,338 compares statistical profiles to determine whether the difference between the statistical profiles indicates suspicious network activity.

The host based intrusion prevention appliances use all the techniques used by network based intrusion prevention systems. In addition, a few host based intrusion prevention systems such as the one from Okena, Inc (now Cisco Systems) uses behavioral policies of applications to stop intrusions.

The methods used for the detection and removal of computer worms are very similar to those that are used for the detection and removal of computer viruses. There are three popular methods for the detection of the malicious code: signature scanning, sandbox techniques to detect polymorphic viruses, integrity checking based on CRC sums of disk files/system sectors. In addition to these methods, a few known systems use behavioral blockers to stop viruses and worms.

The problem with stateless or stateful signature methods for network or host based intrusion detection is the number of false positives or false negatives that are generated. The lack of accuracy in detection makes them unreliable methods for automatic prevention. When an attack is detected, taking the drastic step of dropping packet or session may result in blocking legitimate traffic or users. On the other hand, letting the packets go may let the attack go in. For this reason, the users don't use these systems for automatic prevention. These systems generate a passive response such as alerts, which are analyzed by administrators. It is the responsibility of administrators to stop the attack.

The protocol decode methods for network or host based intrusion detection are good at detecting crafted protocol data. There are two weaknesses of these methods. First, protocols keep changing, and new enhancement to protocols requires new software upgrades or patches to these devices. Second, the most intrusion attempts take advantage of vulnerabilities in applications running these protocols. The protocol decoding techniques cannot detect the misuse of these vulnerabilities. They will only detect whether a packet conforms to defined standards. For this reason, the traditional approach is to combine protocol decode techniques with signature analysis to detect intrusion. A few systems available in the market provide built-in features to detect well-known vulnerabilities, for example, removing obfuscation from HTTP URIs.

The problem with anomaly detection methods for intrusion detection is that they cannot detect intrusions with 100% accuracy, and hence prone to false positives and false negatives. The lack of accuracy makes these methods unsuitable for automatic prevention. Their primary application is in detection of unknown and hidden attacks and then let the administrators manually verify and stop the attacks.

Another thing to be noted it that is that to stop an attack it is not always acceptable to either drop packet or session. For example, most anti-virus products will remove or nullify a virus in a file. They don't delete the files. For automatic prevention to work, the prevention-response need to be more sophisticated and customized.

The deficiency of host based intrusion prevention solutions that use behavioral policies are three fold. First, these solutions are considered to be very intrusive, since they intercept every system call and may have significant impact on the behavior and performance of the system. Second, the management overhead is significant, which makes it difficult to install them on all computer systems in an organization. Third, these solutions do not cover all attacks. There are a number of attacks that will not violate the behavioral policies. For example, libc buffer overflow attacks do not violate the behavioral policies used to protect against buffer overflows.

Using anti-virus methods to protect against computer worms has a number of disadvantages. First, the computer worms spread through network and if a gateway based anti-virus solution is used to protect against them. The performance of such an appliance will be very low. Second, most anti-virus solutions rely heavily on signature scanning to stop malicious code (viruses and worms). This method will never detect unknown worms. The behavioral methods to stop computer worms also have two weaknesses. First, these methods will not stop computer worms that are not violating pre-defined behavioral policies. Second, this solution requires putting the prevention apparatus on every computer system that we need to protect. The management overhead may not make it feasible for many organizations.

BRIEF SUMMARY OF INVENTION

The primary object of the invention is to provide a method and apparatus for preventing both known and unknown intrusions exploiting known vulnerabilities and exposures.

Another object of the invention is to provide a method and apparatus for filtering known and unknown computer worms that have the ability to spread automatically and exploit known vulnerabilities and exposures.

Another object of the invention is to provide a method and apparatus for detecting intrusion attacks in a manner that result in significant reduction in false positives compared to existing methods for intrusion detection.

Another object of the invention is to provide a method and apparatus for stopping denial of service (DOS) attacks that not only take advantage of layer 2-3 vulnerabilities, but also layer 4-7 vulnerabilities.

A further object of the invention is to provide a method and apparatus that significantly reduces the time taken to capture information about known vulnerabilities and exposures for the purpose of stopping intrusions, DOS attacks, and computer worms. Yet another object of the invention is to provide a method and apparatus that translates information captured regarding vulnerabilities and exposures into an intermediate form which optimizes the performance of the apparatus and methods used to detect and stop intrusions, DOS attacks, and computer worms.

Still yet another object of the invention is to provide a method and apparatus that significantly reduces the cost of vulnerability management.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a method and an apparatus for the detection and prevention of intrusions, DOS attacks, and computer worms comprising of: 1) dynamically loading information about vulnerabilities and exposures 2) intercepting application data 3) using information about vulnerabilities and exposures to detect their exploitation 4) taking custom action to stop the exploitation. This apparatus further comprises of: 1) virtual patches for vulnerabilities and exposures, 2) Instances of interpreter core engine that detect the exploitation of vulnerabilities and exposures and take action to stop them, and can dynamically load the virtual patches for newly discovered vulnerabilities and exposures 3) Virtual proxies that interface with transport layer to intercept application data and manage application sessions, and use instances of interpreter core engine for vulnerability and exposure processing. This method further comprises the steps of: a) instantiating one virtual proxy for every application that needs protection 2) instantiating one interpreter core engine for every application that needs protection 3) interfacing of a virtual proxy with the transport layer 4) interfacing of a virtual proxy with an instance of interpreter core engine 5) decoding application information elements 6) processing virtual patches of known vulnerabilities and exposures 7) dynamically loading virtual patches for vulnerabilities and exposures.

Invention also includes an apparatus and method for reducing time it takes to capture information about vulnerabilities and exposures for the purpose of detecting their exploitation and stopping it. Invention further includes an apparatus and method to convert information about vulnerabilities and exposures into an intermediate form that optimizes the processing speed of the method and apparatus for stopping intrusions, DOS attacks, and computer worms.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 shows how an apparatus that uses this invention will be placed in an organization to stop intrusions, DOS attacks, and computer worms.

FIG. 2 shows the key elements of apparatus for stop intrusions, DOS attacks, computer worms.

FIG. 3 shows primary elements of a network-based apparatus that uses this invention to stop intrusions, DOS attacks, and filter worms.

FIG. 4 shows primary elements of a host-based apparatus that uses this invention to stop intrusions, DOS attacks, and filter worms.

FIG. 5 shows how EIC and DP will be used to construct ICS

FIG. 6 shows relationship between dynamic application elements and semantic trees FIG. 7 shows a table of known CVE vulnerabilities and exposures.

FIG. 8 shows elements of a method and apparatus that reduces the time it takes to create virtual patches for vulnerabilities and exposures.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

1. Dynamic Injection of Vulnerability Information to Stop Intrusions/DOS/Computer Worms Attacks MITRE organization manages Common Vulnerability and Exposures (CVE) project that is funded by FedCIRC and US General Services Administration. CVE is a list of standardized names for vulnerabilities and other information security exposures. CVE names all publicly known facts about computer systems that could allow somebody to violate a reasonable security policy for that system. CVE editorial board differentiates between vulnerabilities and exposures. Exposures refer to security-related facts that may not be considered to be vulnerabilities by everyone. For example, SMTP VRFY and EXPN commands reveal user information. RFCs require an SMTP application to support these commands and many administrators will consider them legitimate application features. At the same time, many intruders use these commands for reconnaissance attacks, and there are reasonable security policies that disallow their use. This invention has adopted CVE editorial board's definition of vulnerabilities and exposures.

Both intrusions and computer worms exploit the vulnerabilities in applications. In general as soon as a new vulnerability in an application becomes known and it is assumed critical, the application vendor works to issue application patch for it. Usually this process takes somewhere between 48 hours to 3 months. Once the patch becomes available, not all users of that application immediately apply that patch. A number of studies show that if an organization decides to patch every vulnerability, as it becomes known, the cost of doing so will be very high. In reality, most organizations wait for cumulative patches that cover multiple vulnerabilities at a time to reduce the cost of the patch management. During the period an application remains un-patched, an organization is vulnerable to intrusion, DOS and computer worm attacks. For example, the vulnerability exploited by SQL slammer worm was known and its patch was available 6 months prior to its emergence. In spite of that many organizations had not applied the patch for it.

By stopping the exploitation of vulnerabilities, this method and apparatus prevents intrusions and computer worms. For every known-vulnerability, it dynamically injects the following information into an apparatus that will stop the exploitation of vulnerabilities:

1) A description of the vulnerability that will permit the detection of its exploitation without any false positives.

2) Once an exploitation is detected, how to handle it. It may require dropping the session or removing the malicious content from the application session. The description of the vulnerability should be detailed enough to allow the system to take this action.

Cumulatively the information captured by these two items will be referred to as a "Virtual Patch" in the rest of invention description.

Most intrusion and computer worm attacks contain two components. First, they contain data that will exploit the vulnerability and second they contain malicious code. It is the vulnerability piece that allows an intruder or computer worm to execute its second component without any manual intervention. Computer worms that don't require any manual intervention to infect a vulnerable computer system can spread much faster and cause much higher damage than any other form of malicious code. The method and apparatus presented in this invention stops anyone from exploiting vulnerabilities in applications. By doing so, it stops all known and unknown intrusions and computer worms exploiting known vulnerabilities.

2. Dynamic Injection of Exposure Information to Stop Intrusions/DOS Attacks/Computer Worms Not all computer worms, intrusions and DOS attacks exploit vulnerabilities. There are intrusions/DOS attacks and computer worms that take advantage of exposures (as defined by CVE) instead of vulnerabilities (as defined by CVE). By stopping the exploitation of the exposures, this method and apparatus also prevents these types of intrusions, DOS attacks, and computer worms. An apparatus can automatically stop vulnerability exploitation, but stopping the exploitation of exposures is tricky. A two-step process is used to handle newly discovered exposures:

1. A virtual patch for all newly discovered exposures is automatically injected in the apparatus. Each virtual patch includes two pieces of information:
   a) A description of the exposure that will permit the detection of its exploitation without any false positives.
   b) Once an exploitation is detected, how to handle it. It may require dropping the session or removing the malicious content from the application session. The action will be configurable and controlled by a system administrator.

2. Since not everyone considers an exposure a vulnerability, a security administrator makes a decision whether to enable an exposure processing or not. It is security administrator that decides the severity of an action, when an exploitation of an exposure is detected.

In the prior art, the known methods and apparatuses for exposure management have a predefined set of built-in exposures. Accepting new exposures requires software/hardware level upgrades/patches. This method and apparatus can dynamically accept new exposures as they are discovered. No software/hardware upgrades/patches are needed to manage new exposures.

3. Primary Elements of the Method and Apparatus for Stopping Intrusions, DOS, and Computer Worm Attacks Turning now descriptively to the drawings, in which similar reference characters denote similar elements throughout the several views, the attached figures illustrate a method and apparatus for intrusion prevention, computer worm filtering, and advanced application policy enforcement.

FIG. 1 shows how this invention apparatus can be placed in an organization to prevent intrusion/DOS attacks/and computer worms. This organization has three zones, DMZ, finance, and rest of the network. The host-based apparatus is used to secure SMTP server 111, web server 112, and DNS server 113. A network-based apparatus 109 is used to secure finance zone, and another network-based apparatus 110 is used to secure rest of the network. A centralized management system 102 manages all these apparatuses. This management system is responsible for injecting virtual patches for newly discovered vulnerabilities and exposures into apparatuses. It will also allow security administrator to enable exposure policies, and manage alerts and audit trails generated by various apparatuses.

Turning now to FIG. 2, there is shown primary elements of the apparatus and method that stops intrusions, DOS attacks, and filters computer worms. The packets that may contain intrusions, computer worms, and policy violations are intercepted by virtual proxies 201. There is a separate virtual proxy for a different type of application. For example, there will be a separate virtual proxy for Microsoft IIS web server and a separate virtual proxy for Microsoft Exchange Email Server. The function of a virtual proxy is to receive application data from transport layer, manage sessions, and provide an interface to the interpreter engine for taking custom action which can be drop selective information, drop session, or modify the application data.

The core interpreter engine 202 maintains the database of virtual patches for known vulnerabilities and exposures. Each virtual proxy uses core interpreter engine 202 to check if the application information inside packets is exploiting the vulnerabilities, or exposures. If yes, the interpreter engine takes predefined action to stop it.

This method for intrusion prevention can be used to build a network as well as a host based apparatus. The network-based apparatus can protect against exploitation of all remotely exploitable vulnerabilities, while host based apparatus can protect against both local and remotely exploitable vulnerabilities.

The vulnerability and exposure processing consists of three steps. First it requires selectively decoding the application data in the packet. Second, vulnerability, or exposure processing procedures are used to check if someone is exploiting vulnerability or an exposure, or violating a policy. Finally, if an exploitation of vulnerability or an exposure is detected, a custom action is taken to prevent intrusions and computer worms. The custom action may require dropping specific information, inserting new information, or normalizing the content of application elements. In some cases, the action may require tearing down a complete application session that is exploiting a vulnerability/exposure.

The application decoding procedure can be pre-defined in the decoder plug-in 204. These procedures also can be defined externally and injected at the run time in virtual patches for vulnerabilities and exposures that need the elements decoded by these procedures. In general, vulnerability and exposure procedures are externally defined and injected in the apparatus at the run time. There may be cases when vulnerability checks are built-into protocol decoder or into a policy module. The presence of such functions will depend on the application that is being protected from exploitation.

FIG. 3 shows a network-based apparatus that uses this method to prevent intrusions, computer worms, and policy violations. In addition to the view provided by FIG. 2, this drawing also shows layer 2-3 processing done on application packets. An access policy engine 301 checks the layer2-layer3 header of all incoming Internet Protocol (IP) packets and makes the decision to drop the packet, bypass the packet across the apparatus, or send it for TCP/IP processing. There are TCP, UDP, IP, and ICMP interceptors 302 which can handle all transport layer vulnerabilities and exposures. These interceptors also use an interpreter engine to capture and process externally defined vulnerabilities and exposures. The TCP/IP layer makes the decision to forward the packet to egress or send it to one of the virtual proxies 303 to check application level vulnerabilities and exposures.

FIG. 4 shows a host based apparatus that uses this method to prevent intrusions, computer worms, and policy violations.

In addition to the view provided by FIG. 2, this drawing also shows layer 2-3 processing done on packets. An access policy engine 401 checks the layer2-layer3 header of all packets and makes the decision to drop the packet, or send it for TCP/IP processing. There are TCP, UDP, IP, and ICMP interceptors 402 which can handle all transport layer vulnerabilities. These interceptors use the similar interpreter engine to capture and process externally defined vulnerabilities. The TCP/IP interceptors drop the packet, forward to the external application specific processing module 403, or send it directly to application virtual proxy 404. The external application-processing module is an external module. It performs extra processing such as SSL decoding, or SQL transport layer functions. Once these functions are performed, the external processing module 403 forwards information to the application virtual proxy 404. The application virtual proxy uses the core interpreter engine to check for the exploitation of vulnerabilities and exposures.

4. Core Interpreter Engine

This module in this method and apparatus interprets virtual patches for vulnerabilities and exposures. Every virtual proxy uses its own instance of the interpreter engine. Each instance of the interpreter engine uses an interpreter configuration structure (ICS) to control the processing of application data for the purpose of detecting exploitation of vulnerabilities and exposures. Each ICS contains one or more of the following components:

Semantic tree structures and their roots
Procedures to control client and server session state machines
Protocol level parameters that control decoder plug-in
Additional protocol level parameters that control processing of vulnerabilities and exposures
List of application information elements that decoder plug-in should extract.
Procedures used to process events when exceptions are detected by the decoding procedures
Procedures used to initialize a session context
Procedures to free-up storage for a session context
Procedure to free-up memory when the interpreter configuration data structure is removed
Compiled set of regular expressions, pattern lists, and value list
Generic DOS control parameters
A reference count When an administrator or an external configuration management tool wants to load a new configuration that contains virtual patches for newly discovered vulnerabilities and exposures for an application, two pieces of information are provided: a file which contains the decoder plug-in (DP) and a file that contains an external interpreter configuration (EIC). Information from these files is loaded dynamically and a new instance of interpreter configuration data structure is created. FIG. 5 shows the relationship among ICS, EIC, and DP. After a new ICS is created, new application sessions use new ICS, while existing sessions continue to use old ICS.

The general function of a Decoder. Plug-in (DP) is to allow interpreter to decode information elements from the data received from the application client or server. DP provides one or more of the following components to the interpreter:

A procedure to build semantic trees
A procedure to control session state machine
Protocol level parameters that control decoder plug-in
Procedures used to process events when exceptions are detected by the decoding procedures
A procedure to initialize decoder related session context
A procedure to free decoder related session context A procedure to create a data structure which contains all information elements that can be enabled for decoding Procedures for decoding information elements and maintaining session context related to decoder session context The general function of External Interpreter Configuration (EIC) is to enable interpreter core engine to detect exploitation of vulnerabilities and exposures. EIC provides one or more of the following components to the interpreter:

A procedure to enhance or change semantic trees

A procedure to change protocol level parameters that control decoder plug-in

Protocol level parameters that control processing of vulnerabilities, and exposures List of application information elements that decoder plug-in should extract.

Changes to the procedures used to process events when exceptions are detected by the decoding procedure Procedure used to initialize session context related to processing of vulnerabilities, and exposures Procedure used to free external session context Virtual patch processing procedures for vulnerabilities and exposures All regular expressions, pattern lists, and value lists that need to be compiled Generic DOS control parameters Semantic Tree Structure: Semantic tree contains information that allows how and when to trigger the processing of various vulnerabilities and exposures. The tree structure contains static semantic elements. FIG. 6 shows the relationship between static semantic elements and dynamic elements. There is one static semantic element for each type of application information element as well as a different type of stateful parameter for a session. Each static semantic element contains information on what needs to be done when an information element is decoded or when a change occurs in a stateful parameter. Each interpreter instance may contain multiple semantic trees. There is one semantic tree to capture one type of information or one set of stateful parameter elements. In general, there will be one tree for processing information elements for the data coming from the application client, and one tree for stateful parameters associated with client data, and one tree for processing information elements for the data coming from the application server, and one for stateful parameters associated with server data.

In FIG. 6, information element IE (601) is of type A. The static semantic element for an information element of type A is SSEA (602). Similarly, the static semantic element for information element IE1 (603) of type B is SSEB (606). IE2 (604) and IIE3 (605) are of same type C and their static semantic element is SSEC (607). This drawing shows two semantic trees: one for information elements, while second for session stateful parameters.

Static Semantic Elements:

Each static semantic element contains the following information:

A list of processing procedures for vulnerabilities and exposures

A list of procedures to further decode the children of the corresponding information element.

whether to pass, flush, and load an element or not?

Passing an information element means it should be forwarded to the destination. Flushing an information element means freeing up the memory that stores the element. Loading an information element means, we keep a copy of the content of the element even after it has been passed to the destination. If loading is performed before passing, the content and structure of an information element is maintained even after the element has been passed to the destination. On the other hand, if loading is not enabled, the content of the element is freed up immediately. The element structure is maintained until flushing occurs.

Initializing semantic tree structure: When a new interpreter configuration structure (ICS) is instantiated, it uses the procedure provided by decoder plug-in (DP) to build static elements in the tree. It then calls the procedure provided by EIC to populate each static elements with vulnerabilities, and exposures. The EIC procedure also initializes flags that provide information regarding passing, flushing, and loading.

Initializing protocol level parameters: Interpreter uses the procedure provided by DP to create structure that contains all protocol parameters that are used during decoding. Once this structure is created, interpreter uses the procedure provided by EIC to fine tune them. These parameters are stored in the new ICS. Interpreter also uses the procedure provided by EIC to create a structure for protocol parameters that are used by processing elements defined in EIC.

Initializing exception events for the decoder plug-in: Interpreter uses the procedure provided by DP to create a structure that contains all event procedures that will be used to generate events when an exception is detected. The exception event contains two elements. First what action should be taken on the data that resulted in the exception? Second, it contains information on what type of message, log, alert, or audit trace should be created. EIC can redefine event procedures used by decoder. Interpreter uses the EIC procedure to make final changes to the event structure.

Enabling What to Decode and What not to Decode: Usually each application data unit may contain thousands of information elements. It will be very time consuming if every element is decoded. To avoid that, a list of elements that are used by vulnerabilities, and exposures is maintained. Only these elements are decoded. This permits a significant boost in the performance of the interpreter engine. ICS maintains the list of application information elements that decoder plug-in should extract. This list is initialized using a procedure provided by EIC.

Initializing Session State: Every new application session that is created will initialize its context using the procedure from ICS. There are two components of session context. One component is initialized using the procedure provided by DP, while other is initialized using the procedure provided by ECS.

Managing Reference Count: When new vulnerabilities, and exposures are defined, or old ones modified, a new ICS is loaded at the run time. For all new application sessions, the new ICS is used, while old connections continue to use the old ICS. Every time a connection is created the reference count for its ICS is incremented. Similarly, every time a connection is terminated, the reference count is decremented by 1. When the reference count of a configuration structure becomes zero and it is not the latest configuration structure, this configuration structure is removed from the interpreter.

Triggering Virtual Patch Processing Procedures: After decoding of an information element has occurred, the following procedure is used to trigger the processing of various processing procedures:

```
int trigger_processing_elements (Session, DecodedInformationElement) {
    get static semantic element for DecodedInformationElement
    list=get list of processing elements from static semantic element
```

```
if the list is null {
    if the PASS flag of a semantic element is set
        pass_information_element    (DecodedInformation-
            Element);
    if the FLUSH flag of semantic element is set
        pass_information_element    (DecodedInformation-
            Element);
    if the LOAD flag of semantic element is set
        load_information_element    (DecodedInformation-
            Element);
    return 0;
}
for each processing element in the list do {
    get processing procedure and properties of processing
        element (PE)
    if processing procedure type is of information element
        decode {
        check if the decoding for the children of
DecodedInformationElement is enabled, if yes {
    ret=processing procedure (Session , PE properties,
DecodedInformationElement);
    if (ret<0) return ret;
    }
    } else {
    ret=processing procedure (Session , PE properties,
DecodedInformationElement);
    if (ret<0) return ret;
    }
    go to next element;
}
if the PASS flag of a semantic element is set
    pass_information_element    (DecodedInformationEle-
        ment);
if the FLUSH flag of semantic element is set
    pass_information_element    (DecodedInformationEle-
        ment);
if the LOAD flag of semantic element is set
    load_information_element    (DecodedInformationEle-
        ment);
return 0;
}
```

Virtual Patch Processing Procedures: Every virtual patch is converted into one or more processing procedures. Each processing procedure contains five types of processing statements:

- Statements to retrieve dependencies
- Statements to decode information elements if the processing procedure is a decode procedure, or statements to process vulnerabilities, and exposures
- Statements to pass a pre-selected set of information elements to destination
- Statements to flush a pre-selected set of information elements
- Statements to load a pre-selected set of information elements

```
int virtual_patch_processing procedure (Session, PE Proper-
ties, DecodedInformationElement){
    variable definitions;
    statements to retrieve all dependencies;
    if processing procedure is information element decode
        type {
        Statements to decode information elements
    } else {
        Statements to process vulnerabilities and exposures;
    }
    pass a select set of decoded information elements;
    load a select set of decoded information elements;
    flush a select set of decoded information elements;
    return 0;
}
```

Generic DOS Control Parameters:

Every application, given the resources available, has limitations that can result in denial of service attacks. If the application has known vulnerability, its exploitation can be stopped using the method described above. On the other hand, if it is an exposure that depends on the hardware resources available to the application, the security administrator needs to define a policy to handle this scenario. Key parameters that can be used to define this type of exposure policy are:

a) Maximum number of open sessions for an application b) Maximum number of sessions that are waiting for data: Most applications have request and response type of session activity. If a session receives incomplete request or response, it will wait for data. Many applications have vulnerabilities in this arena.

c) Maximum number of sessions that are inactive, sessions that have been inactive, but they are not waiting for data d) Timeout for a session that is active. Usually, most applications have built-in support for timeout. There are scenarios, where security administrators want the control over this parameter.

e) Timeout for a session that is waiting for data: Many applications have built in support for timeout, and many don't. There are applications that don't support this timeout in some state while they do in others. There are scenarios, where security administrators want the control over this parameter.

Interfacing with a virtual proxy: Every instance of an interpreter engine will interface with a virtual proxy to receive application data. When new data comes, the virtual proxy calls procedures that control the session state machine. For an interpreter instance, The ICS provides these procedures. Once the client or server related procedure is called, the interpreter instance continues the processing from where it was left last time. The interpreter instance also interfaces with virtual proxy to take custom action when an exception is detected.

An interface to load EIC and DP: Each instance of interpreter core engine provides an interface to dynamically load virtual patches (EIC and DP) for the application it is protecting. Once virtual patches are loaded, a new ICS is created from EIC and DP.

5. A Decoder Plug-in (DP)

For the interpreter core engine to build ICS, it needs one or more of the following components from a DP for every application that needs protection:

A procedure to build semantic trees: The DP will create static semantic element (SSE) for every information element it can decode, and every stateful parameter it manages. It also establishes the relationship among various SSEs as described in the previous section.

Procedures to control session state: The DP provides procedures to control the session state. It provides one procedure for processing application data received from a client and another for data received from server. This procedure maintains the session state and uses session state to figure where the processing was stopped last time. It continues the processing until it needs more application data than it is available.

Protocol level parameters that control decoder plug-in: These parameters guide DP during the decoding process. EIC can change the values of these parameters.

Procedures used to process events when exceptions are detected by the decoding procedures: These procedures are exposed as EIC can change them. Ability to change allows further control on the behavior of a DP.

A procedure used to initialize decoder related session context: This procedure initializes the session context that is managed by a DP.

A procedure used to free decoder related session context: This procedure is used to free-up the memory associated with a session and managed by a DP.

A procedure to create a data structure which contains all information elements that can be enabled for decoding: DP will create this structure, but EIC will set it up.

Procedures for decoding information elements and maintaining session context related to decoder session context: The decoding procedure should be defined in a manner they can be inserted into semantic tree for automatic decoding Procedures for inserting decoding procedures into semantic trees: This procedure will use the structure that contains what elements need to be enabled to insert decoding procedures into semantic trees. These procedures are inserted in a manner that procedure trigger_processing_elements defined in the previous section will automatically perform decoding whenever needed. No additional procedure calls are needed to decode information elements or manage decoder related session states 6. External Interpreter Configuration (EIC)

EIC provides one or more of the following components to the interpreter for every application that needs protection:

List of application information elements that decoder plug-in should extract: EIC has information about vulnerabilities and exposures. This information can be used to enable what elements should be decoded and what are not needed.

A procedure to enhance or change semantic trees: The procedures for processing vulnerabilities and exposures need to be inserted into semantic tree.

A procedure to change protocol level parameters that control decoder plugin: The processing of vulnerabilities may require changing the decoder behavior by using these parameters.

Protocol level parameters that control processing of vulnerabilities, and exposures: The processing of vulnerabilities may require defining new protocol level parameters.

Changes to the procedures used to process events when exceptions are detected by decoding procedures: Exposure policies may require changing the action when a DP detects an event.

A procedure used to initialize session context (external) related to processing of vulnerabilities and exposures.

A procedure used to free external session context.

Virtual patch processing procedures for vulnerabilities and exposures: The definition of these procedures will conform to the structure outlined in the previous section.

Regular expressions, pattern lists, and value lists that need to be compiled: These items need to be extracted from the description of vulnerabilities, and exposures.

Generic DOS control parameters.

7. Virtual Proxy

The function of a virtual proxy is to receive application data from transport layer, manage sessions, and provide an interface to the interpreter engine for taking custom action which can be to drop selective information, drop session, or modify the application data. There is a separate virtual proxy for a different type of application. For example, there will be a separate virtual proxy for Microsoft IIS web server and a separate virtual proxy for Microsoft Exchange Email Server.

A virtual proxy differs from an application proxy technology in the prior art in the following manner:

1) The virtual proxy function and behavior is same for all applications. There is no need to develop a separate virtual proxy for different applications.

2) Each virtual proxy uses an instance of interpreter engine to process vulnerabilities and exposures.

3) It provides an interface to interpreter engine that can be used to bypass, drop, insert, and modify selective components of an application data, resulting in improved performance for the apparatus.

4) It provides an interface to interpreter engine to fine tune generic DOS control parameters for managing sessions.

Each virtual proxies interfaces with transport layer to perform the following functions:
  a) Selectively Intercept application data information
  b) Instruct transport layer to drop, pass, or bypass application information
  c) Send application information elements to destination Each virtual proxy uses the interface provided by an instance of the interpreter core engine to send application data to the instance for the detection and stopping of intrusions, DOS attacks, and computer worms.

Each virtual proxy provides an interface to the instance of interpreter core engine for the following functions:
  a) The interpreter instance instructing its virtual proxy to pass, drop, or change an information element
  b) The instance instructing its virtual proxy to insert a new information element
  c) The instance instructing its virtual proxy to bypass or remove application data without passing it to the instance 8. A Method and Apparatus for Capturing Vulnerabilities and Exposures to Create Virtual Patches One simple method for capturing vulnerabilities and exposures will be to use a 3G language such as C or C++ to program them, and later compile them into an EIC that the interpreter engine can use. The problem with this method is that the time it takes to capture new vulnerabilities/exposures in a reliable fashion is quite high. Every year somewhere between 1-2 thousand vulnerabilities and exposures are discovered. According to ICAT vulnerability statistics (http://icat.nist.gov/icat.cfm?function=statistics), FIG. 7 shows the vulnerabilities that were discovered and have received CVE name in the last 3 years.

To make this method and apparatus a viable solution for intrusion prevention and computer worm filtering, a solution is needed which can make it faster to capture vulnerabilities and exposures.

Here, a method and apparatus to capture vulnerabilities and exposure is described. This method and apparatus significantly reduces the time it takes to capture vulnerabilities and exposures, and inject them in apparatus used for preventing intrusions and filtering computer worms.

This method and apparatus uses higher-level custom designed language constructs to capture vulnerabilities and exposures. A custom designed translator is used to convert these custom language constructs into an intermediate form that a security system can read and stop the exploitation of vulnerabilities and exposures.

The time saving in the capturing process occurs for two reasons. First, the high level construct allows capturing vulnerabilities/exposures in a much shorter time than programming using 3G programming language constructs. Second, interpreter core engine expects EIC and DP to provide information and procedures that meet certain requirements described in previous sections. If someone was going to manually program EIC and DP for an application in a manner that it meets the requirements described in the previous section, it will be a time consuming process. This method for capturing vulnerabilities uses a translator for automatically converting vulnerability/exposure data to EIC and DP, and provides significant saving in time needed to generate EIC and DP compatible data for an application.

This method provides high level constructs to define vulnerabilities and exposures. The vulnerability/capturing process consists of the following steps:

1) Check if decoder plug-in (DP) provides procedures to decode the information elements needed to process a new vulnerability or an exposure. If it does not support them, use decode-constructs to define new information elements. A translator is used to automatically enhance the existing DP for that application. If no DP exists, a new DP is created.

2) Check if the decoder plug-in manages state parameters needed to capture vulnerability. If it does not support them, a high level construct is used to define new stateful parameters.

3) Check if we need to change an existing protocol level parameter, if yes use a high level construct to do so 4) Check if we need to add a new protocol level parameter, if yes use a high level construct to do so 5) Finally, use high level constructs to capture the semantics of vulnerabilities or exposures.

The primary elements of this apparatus are shown in FIG. 8. The apparatus contains high level construct 801 to define decoding procedures, high level construct 802 to define protocol level context, high level construct 803 to define session state context, and high level construct 804 to define semantic of vulnerabilities and exposures. The high level decode construct 801 further consists of EBNF type construct 805 and 3G Like construct 806. The high level protocol level construct 802 further consists of high level construct 807 for changing protocol context of decoding procedures and high level construct 808 for defining new protocol level context for processing virtual patches for vulnerabilities and exposures. The high-level protocol construct 804 further consists of validation construct 810 and action constructs 811.

High Level Constructs 801 for Capturing Decoding Procedures for Application Information Elements:

The decode procedure for an information element needs to be written in a manner that it fits inside an existing DP and it can be used by interpreter core engine for decoding and triggering processing elements as defined by semantic tree. An extensive analysis of vulnerabilities in various applications such as HTTP, SMTP, FTP, TELNET, DNS, SQL, etc shows that following constructs are needed to capture the decoding rules:

1) EBNF based description of decoding 805: In this type of construct, the EBNF is defined for an information element. A translator automatically generates the DP compatible decoding procedures for all its children. For example, the following constructs will decode information elements needed to capture vulnerability CAN-2002-0649 as defined by CVE (www.cve.mitre.orq) in SQL resolver service:

Decode-Rule: Sql-Resolver-Commands {
    EBNF {%
        Request    :=4-Command\8-Command\Other-Commands;
        4-Command :="\004" Registry-Location;
        Registry-Location :=[.]* End-Of-Packet;
        8-Command :="\010" [.]* End-Of-Packet;
    %}
}

2) 3G Language Like Constructs 806 for Decoding: There are instances where decoding procedure can be better described manually. 3G like constructs with built-in standard decode macros are useful in describing these types of decode procedures. A translator automatically generates the DP compatible decoding procedures from these constructs. For example, the opendatasource procedure in SQL can be extracted using the following high level decode constructs without fully decoding SQL:

Decode-Rule: opendatasource {
    opendatasource=extractProgrammingFunction
        (case=ignore,               parent=SQL-Query,
        function_name="OPENDATASOURCE);
}

Similarly second argument for opendatasource stored procedure can be extracted using the following rule without fully decoding SQL:

Decode-Rule: openrowset-init {
    openrowset-init=extractProgrammingFunctionArgument
        (case=ignore,               parent=SQL-Query,
        function_name="OPENDATASOURCE",
        arg_no=2);
}

Extracting an extended stored query from SQL without decoding complete SQL:

Decode-Rule: st_query{
    exp="EXEC"|"EXECUTE" WSP "@" [a-zA-Z0-9]
        WSP ([a-zA-Z0-9_-]*\.)?dbo.xp_[a-zA-Z0-9] WSP
    st_query=extract_regexp(case=ignore,reg=exp);
}

High Level Constructs 802 for Capturing Protocol Level Context Changes:

There are two types of protocol context changes. The first type requires making changes to the protocol context of DP. The second change requires adding a new parameter in the protocol context managed by EIC. The first type of the change can be captured using a construct of the following type:

Protocol-Context-Decoder-Plugin {
    Parameter-Name: New Parameter-Value;
}

The second type of the change requires defining a new protocol context or changing existing context of EIC:

New-Protocol-Parameter {
    Parameter-Name: name
    Parameter-Type: type
    Parameter-Value: value
}

High Level Constructs for Capturing Session Context 803 Changes:

When a new stateful parameter needs to be captured, it is inserted inside session context defined by EIC for that application. For example, New-Session-Parameter {
  Parameter-Name: name
  Parameter-Type: type
    Flags: various flags such as GENERATE_SEMANTIC_ELEMENT;
}

High Level Constructs 804 for Capturing Semantics of Vulnerabilities and Exposures:

There are two types of constructs: validation constructs and action constructs.

Validation Constructs 810: Following validation constructs are used to capture the semantics of vulnerabilities/exposures:

1) Stateful or stateless Information element-length check: This construct permits definition of minimum and maximum length for an information element.

2) Stateful or stateless Information element matching with regular expression: This construct allows matching a regular expression with the content of an information element.

3) Stateful or stateless Information element value check: This construct allows matching the content of an information element with a given value 4) Stateful or stateless Information element value list check: This construct allows matching the content of an information element with a predefined list of values.

5) Stateful or stateless Information element character set check: This construct checks if the information element contains characters which belongs to the given character class.

6) Stateful or stateless Information element check for tagged components: This constructs extracts components that have a predefined beginning and ending tag pattern.

7) Stateful or stateless Information element check for invalid-content: This constructs allows user to search a set of invalid patterns in an information element 8) Stateful parameter validation: This constructs allows building complex boolean expression using stateful parameters and values of information elements.

9) Generic DOS control: This constructs allows definition of parameter for generic DOS procedure of interpreter engine.

10) 3G Language such as C or C++ Like Validation procedure: This is equivalent to using a 3G language such as C or C++ to capture a vulnerability.

The state for these constructs can be captured using a boolean expression consisting of stateful parameters and values of information elements. These constructs can be mixed and matched, or used in a hierarchical fashion to capture vulnerabilities, and exposures. For example, Stateful-Parameter Validation Construct (boolean-expression-for-acceptance){
  Stateless Information element-length check (min=x, max=y) {
    Action-Constructs
  }
}

Use of constructs from 1-9 provides significant reduction in time taken to capture vulnerabilities/exposures. It is possible to come up with more high-level constructs to further speed up the time it takes to capture vulnerabilities/exposures. Even though the construct number 10 is similar to using a C or C++ language to capture the semantics of the vulnerability, a significant saving in capturing time occurs compared to defining EIC in C and C++. The reason for that is that interpreter expects the EIC to provide information and procedures structured in a format that satisfies requirements outlined above. A translator can automatically generate EIC from the constructs described above, even if the semantic is described using construct number 10.

In practice, we have seen majority of remote vulnerabilities can be captured using constructs 1-9 for most applications. For example, for Microsoft IIS server, we used these constructs to capture 33 known vulnerabilities in its version 5.0, 5.1 and 6.0. We found the following constructs were used to capture these vulnerabilities:

1) Stateful or stateless—Information element-length check: 12

2) Stateful or stateless—Information element-value list check: 3

3) Stateful or stateless—Information element-regexp check: 3

4) Stateful or stateless—Information element-character check: 2

5) Stateful or stateless—Information element-tagged component check: 6

6) Stateful Parameter Validations: 3

7) 3G-Like Validation Procedure: 3

8) Generic DOS control: 1

Action Constructs 811: These constructs are used to define what action should be taken when an exception is detected. Following constructs can significantly save time it takes to capture customized action or response:

1) A construct that makes it easy to send alert and log messages, for example,
  Alert(severity=Low|Medium|High, message="Request with invalid parameter name");

2) A construct that makes it easy to configure how to record audit trail

3) A construct that allows removing malicious content from the session

4) A construct that helps in normalizing malicious content with acceptable content 5) A construct that helps in inserting new content at specific mark in an information element 6) Application specific response construct which uses response macros provided by decoder plugin (DP). For example, an HTTP action macro is described below:

Http_Action(Action=DROP_REQUEST|DROP_SESSION|NORMALIZE|DO_NOTHING, Response-Code=Code)

9. A Method and Apparatus for Converting Virtual Patches for Vulnerabilities and Exposures into EIC and DP This interpreter also includes a method to convert information about vulnerabilities and exposures into an intermediate form that optimizes the processing speed of the method and apparatus for stopping intrusions, DOS attacks, and computer worms. This apparatus and method uses the following techniques to optimize the intermediate form:
  a) Selectively enabling decoding and generating decoding procedure for information elements
  b) Converting high level description of information about vulnerabilities and exposures in an intermediate form that optimizes loading, flushing, and passing of information elements
  c) Extracting regular expressions matches, pattern matches, value list comparisons and convert them in an intermediate form that optimizes their processing
  d) Generating semantic tree that permits selective processing of vulnerabilities and exposures This invention convert the virtual patches of vulnerabilities, and exposures from high-level constructs defined in section 8 into an EIC that meets the requirements described in section 6, and a DP that meets the requirements described in section 5. In addition to allowing an automatic translation, this translator generates EIC and DP data in a manner that optimizes the performance of the interpreter when it is processing vulnerabilities, and exposures in real time. The translator is divided in two components: first component generates decoder plug-ins (DPs), and second component generates (EICs).

9.1 DP Translator

DP translator converts high-level decoder constructs and generates decoder plug-in that meets the requirements described in section 5.

The process for translating two different types of decode constructs is described below:

1) Generating Decoding Procedures from EBNF Construct:

A lot of work has been done in the research community on scanner and parser generators. There are a few differences in the work done in prior art with this translator:
  a) This translator is customized to automatically generate DP that meets the requirements described in section 5
  b) All known methods for scanning work on single buffer to parse tokens. This translator is extended to work with multiple buffers. This mechanism can save significant time in copying data from one place to another, resulting in improved performance for translation
  c) The translator also generates logic for automatically triggering processing elements when an information element is decoded
  d) Translator supports all types of grammars LL(n), LR(n), or LALR(n), but the real time parsing performance degrades as the degree of lookup increases. In practice, it is seen LALR(1) grammar can capture the parsing needs of the most applications. For this reason, translator allows changing the level and type of grammar for different type of decoding procedures. By default, the grammar is set to LALR(1).
  e) Translator generates decoder whose context is maintained in a separate data structure during the decoding process. Data is fed to this decoder using a list of buffers. The decoder processes the received data, stores the context into its data structure, and returns. Next time, when the decoder is called, it knows what needs to be decoded next.
  f) It generates one procedure for client session state control and another for server session state control 2) Generating Decoding Procedures from 3G-Language Like Constructs:

This translator generates the decoder whose logic is defined by a 3G constructs in a manner it meets the requirements of a DP as described in section 5.0. The key difference in this translator and the translation technology known in prior art is are:
  a) This translator is customized to automatically generate DP that meets the requirements in section 5
  b) Scanning is automatically extended to work with multiple buffers. This mechanism can save significant time in copying data from one place to another, resulting in improved performance for translation
  c) The translator also generates logic for automatically triggering processing elements when an information element is decoded
  d) Translator generates decoder whose context is maintained in a separate data structure during the decoding process. Data is fed to this decoder using a list of buffers. The decoder processes the received data, stores the context into its data structure, and returns. Next time, when the decoder is called, it knows what needs to be decoded next.
  e) It generates one procedure for client session state control and another for server session state control 9.2 Information that DP-Translator Generates for EIC-Translator DP-translator generates the following information for its peer EIC-translator:
  DP name
  Information elements, their type, maximum size, including the information about which ones are root
  The order in which various information elements will be decoded.
  Parent/Child relationship among various elements
  Name of the structure that contains decoder related static semantic elements
  Name of the structure that contains decoder related information elements
  Structure name and parameter description of the decoder related protocol context
  Structure name and parameter description of the decoder related session context
  All application specific custom validation procedures and their arguments
  All application specific custom action procedures and their arguments There are a number of methods to transfer this information to EIC translator. One simple method is to generate a header file that can be easily parsed by the EIC translator.

9.3 EIC Translator

EIC translator converts all high level constructs except the decode construct into an EIC that is compatible with the requirements defined in section 6 and produces optimal performance for the interpreter engine.

Procedure to Enhance or Change Semantic Trees

EIC translator inserts procedures for vulnerabilities, and exposures into semantic tree. The method to do so is described below:

Translator analyzes all dependencies of each procedure, and finds which one will be decoded at the end. The static semantic element for the last dependency is retrieved, and the procedure is inserted in its list of processing elements. If it is not possible to determine which dependency will become known last, an information element is selected that the translator knows will be decoded after all the dependencies, and it puts the procedure in the static semantic element of this information element.

The generation process for procedures for protocol and state context management (creation, changes, initialization, and freeing up) from high-level construct is predefined one-to-one translation.

Generating Processing Procedures for Vulnerabilities, and Exposures

Every processing procedure contains the following statements:
1) Variable definitions
2) Statements to retrieve all dependencies
4) Statements to process vulnerabilities, and exposures
5) Pass a select set of decoded information elements
6) Load a select set of decoded information elements
7) Flush a select set of decoded information elements Variable Definition Generation The variable definition for all high level validation and action constructs is predefined except for 3G-Like construct. This information can be embedded inside translator. For 3G like constructs, the syntactical analysis required is similar in nature to 3G languages to extract the variable definitions.

Statements to Extract Dependencies

One global symbol table is created. This symbol table contains the information about information elements decoded by the DP, and state and protocol contexts maintained by the DP and EIC. Every symbol contains information on how to retrieve it from information elements, state contexts, or protocol contexts.

For every procedure, a list of dependencies is created. For every procedure dependency, the corresponding symbol is checked if it is searched in the global symbol table. An assignment statement is generated which assigns the source of the global symbol to the procedure dependency. For example, assume the dependency is a query-string for HTTP vulnerability. The following statement will retrieve it:

local-variable-query-string=session.structure-containing-information-elements.query-string Statements to process vulnerabilities, and exposures: Statements that needed to be generated for various validation and action constructs are pre-defined except for 3G-like constructs. The translation process for 3-G like constructs is similar to the one used by 3G languages. One important aspect of this translation is generation of lists of regular expressions, pattern-lists, and value-lists, and using their compiled form in the generated statements.

Algorithm for Loading Information Elements

An application level policy defines what is the maximum information that is allowed to stay in transit for an application session. At the time of processing vulnerability, if the information in transit exceeds this threshold, the loading procedure is triggered.

This loading procedure checks if the information elements that should be passed to the destination are needed for processing elements. If yes, these information elements are loaded, as well as passed to the destination. Otherwise, they are passed to the destination without loading.

Algorithm to Find Information Elements for Passing

In addition to the passing event that occurs on account of loading, the following algorithm is used to generate passing statements for information elements in processing procedures:

For every information element, translator finds the last processing element that:
1. Either will drop the session if an exception is detected.
2. Or change its content if vulnerability is detected.

It decides to generate the statement for passing of this information element in this processing element. If there are more than one processing elements that are potential candidates to be the last elements, it finds a processing element that will be triggered after all these processing elements, and it generates passing statement for this information element inside this processing element.

If the maximum size of the parent of an information element is small by itself, there is no need to pass its children until all the processing elements that depend on the parent and its children have been executed. The application level context parameter defines the threshold that determines what is considered small.

Algorithm for Flushing Information Elements

1) A parent information element is not flushed, if it has at least one child that cannot be flushed 2) If the decision is made to pass an element, and it is not loaded it can be flushed 3) If an information element is passed as well as loaded, the flushing occurs after all the processing elements that are using this information have been executed.

4) Flushing can be postponed if the maximum memory occupied by all the elements is smaller than a predefined threshold.

5) When root information element has been completely decoded and processing elements have been executed, the root and its remaining children should be flushed.

Compiled set of regular expressions, pattern lists, and value lists: The processing procedures for vulnerabilities, and exposures may be using regular expression matching, pattern matching, or comparison with a list of values. This information is pre-compiled into a form that permits high-speed performance at the run time. For example, the interpreter uses deterministic finite automata algorithm (DFA) for regular expression matching. This algorithm allows regular expressions to be compiled into a form that can be used to perform fast processing at the time of matching. EIC provides the list of regular expressions, pattern list, and value list that needs to be compiled, and interpreter compiles them to populate ICS. EIC uses the compiled form of these components during the processing of vulnerabilities, and exposures.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for using a security apparatus to provide security for a computer system, comprising:
  dynamically loading into the security apparatus information permitting detection of vulnerabilities and exposures for an application and information on how the security apparatus is to prevent exploitation of the vulnerabilities and exposures on the computer system;
  using the security apparatus to intercept data traffic entering the computer system; and
  using the dynamically loaded information to process the intercepted data to prevent exploitation of the vulnerabilities and exposures on the computer system, wherein the using of the dynamically loaded information further comprises using, by the security apparatus, new information on vulnerabilities and exposures to handle new application sessions for the application and continuing to use old information on vulnerabilities and exposures to handle existing application sessions for the application.

2. The method defined in claim 1 further comprising:
performing transport layer functions including selectively intercepting data traffic, and dropping, forwarding, and bypassing some of the data traffic.

3. The method defined in claim 1 further comprising:
using virtual patches and decoder plug-ins to create an interpreter configuration data structure; and
using the interpreter configuration data structure at the security apparatus to process the intercepted data to prevent exploitation of the vulnerabilities and exposures in the computer system.

4. The method defined in claim 1 wherein there are multiple applications that run on the computer system and wherein information on vulnerabilities and exposures for each of the multiple applications is dynamically loaded into the security apparatus, the method further comprising:
using virtual proxies on the security apparatus to process the intercepted data based on the dynamically-loaded information, wherein there is a separate virtual proxy for each of the applications on the computer system.

5. The method defined in claim 1 wherein the data traffic includes information elements, the method further comprising:
using virtual proxies on the security apparatus to drop at least some of the information elements in the data traffic.

6. The method defined in claim 1 wherein the data traffic includes information elements, the method further comprising:
using virtual proxies on the security apparatus to modify at least some of the information elements in the data traffic.

7. The method defined in claim 1 wherein the data traffic includes information elements, the method further comprising:
using virtual proxies on the security apparatus to insert new information elements into the data traffic.

8. The method defined in claim 1 wherein the data traffic includes information elements of various types, wherein the dynamically-loaded information comprises a tree that contains a static element corresponding to each type of information element, and wherein each static element contains a list of processing procedures for the vulnerabilities and exposures and contains a list of decoding procedures for decoding children of the information elements, the method further comprising triggering the processing and decoding procedures for each information element using the static element corresponding to that information element.

9. The method defined in claim 8, further comprising:
using the static elements in determining whether to pass the information elements.

10. The method defined in claim 8, further comprising:
using the static elements in determining whether to flush the information elements.

11. The method defined in claim 8, further comprising:
using the static elements in determining whether to load the information elements.

12. The method defined in claim 1 further comprising:
converting information about the vulnerabilities and exposures into an intermediate form that is loaded into the security apparatus as the dynamically-loaded information and that optimizes processing speed for the processing of the intercepted data to prevent exploitation of the vulnerabilities and exposures on the computer system; and
identifying information elements that are needed for processing the vulnerabilities and exposures and inserting this information into the intermediate form.

13. The method defined in claim 1 further comprising:
converting information about the vulnerabilities and exposures into an intermediate form that is loaded into the security apparatus as the dynamically-loaded information and that optimizes processing speed for the processing of the intercepted data to prevent exploitation of the vulnerabilities and exposures on the computer system; and
identifying when to load, flush, and pass information elements in the data traffic to minimize latency and inserting this information into the intermediate form.

14. The method defined in claim 1 further comprising:
converting information about the vulnerabilities and exposures into an intermediate form that is loaded into the security apparatus as the dynamically-loaded information and that optimizes processing speed for the processing of the intercepted data to prevent exploitation of the vulnerabilities and exposures on the computer system; and
extracting regular expression matches, pattern matches, and value list comparisons from the information about the vulnerabilities and exposures and converting the matches and comparisons into the intermediate form to optimize the processing of the intercepted data.

15. The method defined in claim 1 wherein the data traffic includes information elements, the method further comprising:
maintaining a list of which information elements are used by the vulnerabilities and exposures; and
during processing of the data traffic, decoding only the information elements in the data traffic that appear in the list.

* * * * *